United States Patent [19]

Cicatelli

[11] 3,732,477

[45] May 8, 1973

[54] SIGNALLING AND CONTROLLING DEVICE FOR MAGNETIC TAPE APPARATUS

[75] Inventor: Rodolfo Cicatelli, Rome, Italy

[73] Assignee: Autovox S.p.A., Rome, Italy

[22] Filed: Mar. 3, 1969

[21] Appl. No.: 803,691

[30] Foreign Application Priority Data

Oct. 9, 1968 Italy..............................40331 A/68

[52] U.S. Cl.............318/463, 178/6.6 A, 200/61.17, 242/57, 307/120, 318/490

[51] Int. Cl............................G03b 1/02, B65h 59/38

[58] Field of Search......................318/463, 464, 465, 318/6, 318, 329, 490; 200/61.17; 178/6.6 A; 307/120, 128, 129; 317/146, 5; 242/55.12, 57

[56] References Cited

UNITED STATES PATENTS

| | | | |
|---|---|---|---|
| 3,042,839 | 7/1962 | Hermes | 317/146 |
| 3,365,615 | 1/1968 | Bart | 307/120 X |
| 3,488,017 | 1/1970 | Schatteman | 307/120 X |

*Primary Examiner*—J. D. Miller
*Assistant Examiner*—Robert J. Hickey
*Attorney*—Hofgren, Wegner, Allen, Stellman & McCord

[57] ABSTRACT

An apparatus for monitoring various conditions of tape feed in a magnetic tape transport as indicated by the take-up reel speed. A commutator detects the speed of the take-up reel and controls a multivibrator which deactivates the tape transport drive motor and flashes an alarm lamp when the take-up reel speed, as represented by the detector output, deviates from a preselected norm.

2 Claims, 4 Drawing Figures

Inventor:
Rudolfo Cicatelli
By Hofgren, Wegner,
Allen, Stellman & McCord
Att'ys

SIGNALLING AND CONTROLLING DEVICE FOR MAGNETIC TAPE APPARATUS

BACKGROUND OF THE INVENTION

1. Field of the Invention

The present invention generally relates to a speed sensitive motor control circuit and in particular to a monitor and control circuit for the drive motor of a magnetic tape transport.

2. Description of the Prior Art

In tape transports, it is necessary to automatically detect various conditions in the tape feed especially when the apparatus uses the so-called "cassettes", wherein the tape is not readily visible. Failure during the winding or rewinding of the tape due to faulty operation of the tape transport mechanism, defective construction of the tape cassette or faulty tape, and depletion of tape from the tape reel are examples of such conditions. Failure of the drive motor to stop after the occurrence of one of these conditions may result in mangled or broken tape or motor failure due to overheating. It is, therefore, an object of the present invention to provide a device applicable to magnetic tape apparatus which will signal such conditions by flashing an alarm lamp and prevent damage to the tape by deactivating the tape transport drive motor and actuate other automatic units when such conditions occur.

SUMMARY OF THE INVENTION

The device of the present invention comprises a commutator-type detector for providing take-up reel speed information, a circuit for altering the speed information into a visable form, and a multivibrator for controlling the drive motor and other recorder units in response to the speed information. The commutator is coupled to the take-up reel and when the take-up reel is rotating, a periodic signal is coupled to the multivibrator which is disabled in response thereto. When the take-up reel falls below a preselected minimum speed, the periodic signal decreases in frequency and ceases to disable the multivibrator. The multivibrator, upon having the disable signal removed, begins to oscillate. This oscillation acts upon a motor speed stabilizing circuit to deactivate the motor. When the motor is stopped, an alarm lamp indicator coupled to the multivibrator flashes on and off at the frequency thereof.

As stated, the commutator is coupled to the take-up reel to signal any irregular winding of the tape as indicated by a reduction in speed thereof. A second commutator-type detector could also be provided to signal tearing of the tape as indicated by an increase in take-up reel speed.

BRIEF DESCRIPTION OF THE DRAWING

Further features and advantages of the invention will be apparent from the following descriptions taken in connection with the accompanying drawings wherein.

DESCRIPTION OF THE PREFERRED EMBODIMENT

Figure 1:
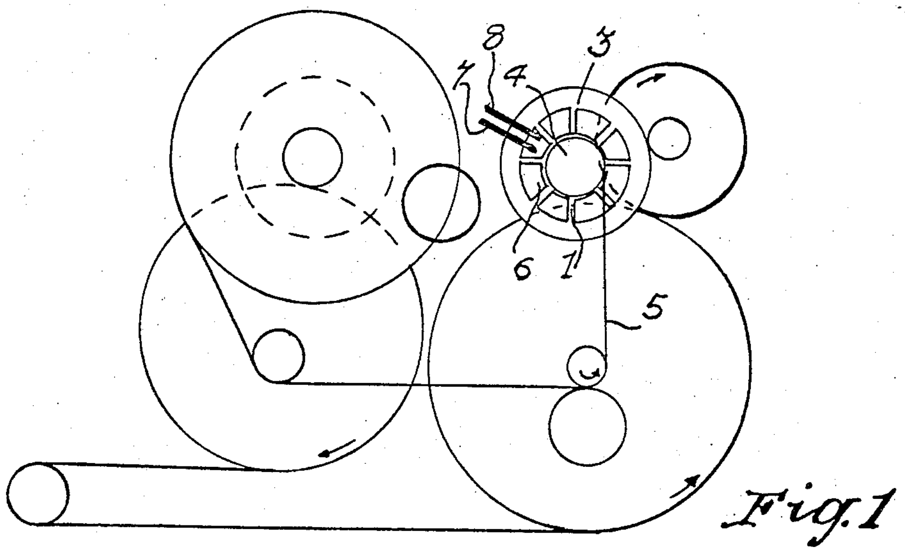
FIG. 1 is a diagrammatic view of a tape transport mechanism with a commutator-type detector coupled to the take-up reel.
Figure 2:
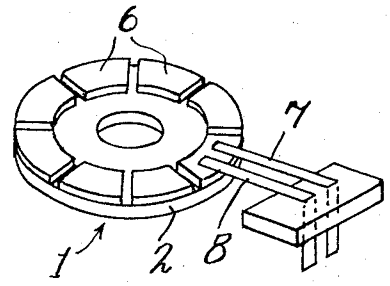
FIG. 2 is a perspective view of the commutator-type detector and its contacts.

Referring now to FIGS. 1 and 2, the detector 1 consists of a commutator 2 which is coaxially fastened to the disc 3 driving the reel 4 which takes up the magnetic tape 5. Two metal brushes 7 and 8 contact the metal segments 6 of the commutator. When the commutator rotates, these brushes are connected and disconnected at a frequency determined by the number of segments multiplied by the number of revolutions per second of the commutator. The commutator may stop with the brush either electrically connected or disconnected. A commutator having from 8 to 16 segments has been found suitable for use with tape cassettes, but in each case, the number of segments required will depend upon the operating speed of the transport mechanism. The remaining elements shown in FIGS. 1 and 2 are of standard form and are not important for a clear understanding of the invention and will not be discussed.

Figure 3:
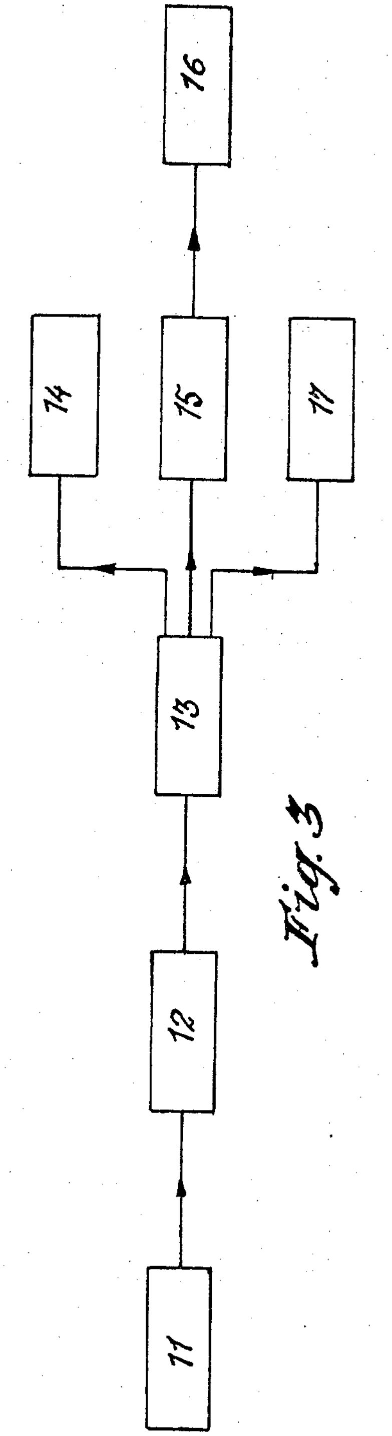
FIG. 3 is a block diagram of the motor control circuit.

A block diagram of the control circuit is shown in FIG. 3. Detector circuit block 11 represents the previously described commutator-type detector shown in FIG. 2, or any other transducer capable of generating a periodic signal having a frequency directly proportional to the speed of the take-up reel. The periodic signal generated by the detector circuit block 11 is coupled to processor circuit block 12. Processor circuit block 12 functions as an interface circuit between the detector circuit and motor control circuit block 13 and generates a disabling signal in response to the periodic signal from detector circuit block 11 until the frequency of the periodic signal decreases below a preselected minimum corresponding to the minimum allowable take-up reel speed.

Motor control circuit block 13 controls tape ejector circuit block 14, the motor circuit 16 through motor stabilizer circuit 15, and alarm lamp indicator 17. The motor control circuit 13 may comprise any circuit having a stable and unstable state, with the circuit being maintained in the unstable state only so long as the disable signal is provided. When the disable signal is removed, the motor control circuit 13 assumes the stable state and deactivates the motor through motor stabilizer circuit 15 which will be explained hereinafter. The motor stabilizer circuit provides a control signal to maintain the motor at the proper speed and is unaffected by the motor control circuit until the control circuit assumes the stable state. Block 14 controls the automatic tape ejection of the tape cassette in response to motor control circuit 13 assuming the stable state, and alarm lamp indicator 17 is provided to visually indicate failure in response to motor control circuit 13 deactivating motor circuit 16.

Figure 4:
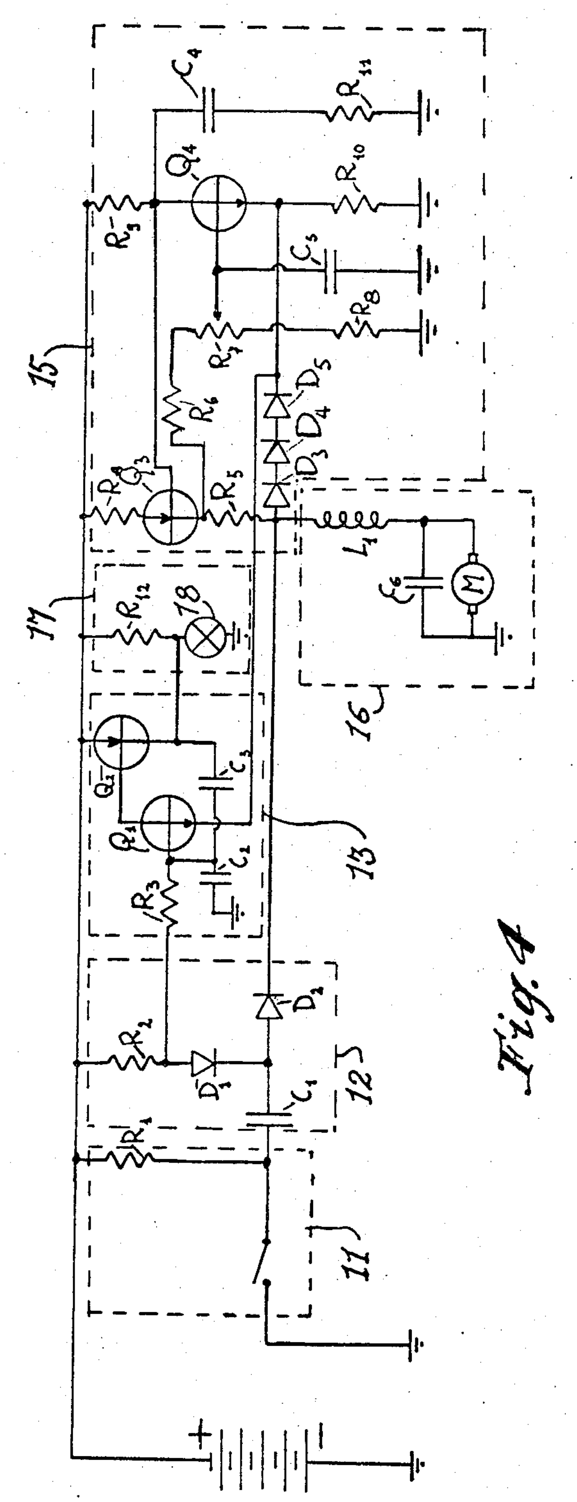
FIG. 4 is a schematic diagram of the circuit blocks shown in FIG. 3.

The circuit elements previously shown in block form in FIG. 3 are shown in schematic form in FIG. 4. The commutator shown in FIG. 2 is schematically represented by a single-pole, single-throw switch 101. Brush 7 is coupled to a reference potential such as ground, and brush 8 is coupled through a resistor $R_0$ to positive, DC supply voltage 103. Brushes 7 and 8 simultaneously contacting a common metal segment 6 corresponds to switch 101 being closed, and brushes 7 and 8 contacting adjacent segments corresponds to switch 101 being in the open position. Thus, as previously explained, a periodic signal oscillating between ground and supply voltage 103 is generated on output 105 of detector circuit 11 at a frequency determined by the speed of the take-up reel and the number of segments on the commutator.

This periodic signal is coupled to capacitor $C_1$ of processor circuit 12. When switch 101 closes, a current from supply voltage 103 through resistor R, Capacitor $C_1$, diodes $D_2$, $D_3$, $D_4$, and $D_5$, and resistor $R_{10}$ charges capacitor $C_1$ toward supply voltage 103. Each time switch 101 closes, the junction between R and $C_1$, output 105 of detector circuit 11, drops to ground. This negative voltage step is coupled through capacitor $C_1$ and appears as a negative spike at the junction between resistor $R_1$ and diode $D_1$, output 107 of processor circuit 12. Capacitor $C_1$ charges toward supply voltage 103 through resistor $R_1$ and $D_1$ until switch 101 again opens. Thus, the maximum voltage appearing at output 107 of processor circuit 12 is determined by the total period of time that switch 101 is either closed or open, which, of course, is a function of the speed of the take-up reel. The maximum voltage appearing at capacitor $C_1$ is directly proportional to the motor speed.

The output signal of processor circuit 12 is coupled through resistor $R_2$ to capacitor $C_2$ of motor control circuit 13. This configuration is essentially an RC integrator circuit with the time constant determined by the product of resistor $R_2$ and $C_2$. Each time switch 101 closes, the negative spike appearing at the input of control circuit 13 discharges capacitor $C_2$ through resistor $R_2$ thus preventing transistor $Q_1$ from turning on. The junction between resistor $R_2$ and capacitor $C_2$ is coupled to the base of NPN transistor $Q_1$ and coupled to the collector of PNP transistor $Q_2$ through positive feedback capacitor $C_3$. The base of transistor $Q_2$, in turn, is connected to the collector of transistor $Q_1$, and the emitter of transistor $Q_1$ is connected to junction between diode $D_5$ and resistor $R_{10}$.

In this configuration, transistors $Q_1$ and $Q_2$ function as an bistable multivibrator. When the speed of the motor lies within the preselected range during normal operation, an insufficient amount of base drive is provided to turn on transistor $Q_1$ due to the long charging time of capacitor $C_2$. Thus, transistors $Q_1$ and $Q_2$ are in cutoff and have no effect upon motor stabilizer circuit 15 during normal operation. However, when the speed decreases, capacitor $C_2$ is permitted to charge above the threshold of $Q_1$ which turns on in response thereto to effect motor turnoff, and oscillation commences as will be explained hereinafter.

The motor stabilizer circuit 15 essentially comprises two transistors coupled in feedback. A power transistor $Q_3$ regulates the current of motor 16, and an NPN amplifier transistor $Q_4$ controls the power transistor in response to RI voltage drop across the motor. The voltage across motor 16, the voltage at the junction between resistor $R_5$ and diode $D_3$ with respect to ground, is the sum of two voltage components. The first component is the resistance times motor current, voltage drop across the motor windings, and the second component is the back electromotive force (emf) voltage induced in the motor. The first component varies linearly with motor current, and the second component, the back emf, varies linearly with motor speed. The motor speed, in turn, is related to the electrical power (V+I) applied to the motor to drive the load.

When an increase load is first applied to the motor, as when tape is wound about the take-up reel, the motor speed and, thus, the back emf, decreases which causes the voltage drop across resistor $R_5$, which is coupled between the collector of PNP power transistor $Q_3$ and motor 16, to increase. The voltage at the junction between resistor $R_5$ and the collector of $Q_3$ is coupled to the base of $Q_4$ through resistors $R_6$, $R_8$, and potentiometer $R_7$, and the total voltage across the motor at the junction between $R_5$ and the motor is coupled through diodes $D_3$, $D_4$, and $D_5$ to the emitter of transistor $Q_5$. Thus, as the voltage drop across $R_5$ increases, a proportionate increase drop appears across the emitter junction of transistor $Q_4$ which conducts more current through resistor $R_3$ and $R_{10}$ in response thereto. An increase in emitter current of transistor $Q_4$ provides greater drive to the base of transistor $Q_3$ which, in response thereto, supplies more motor current. When the motor receives greater current from supply voltage 103 through resistor $R_4$, transistor $Q_3$, and resistor $R_5$, its speed increases until the back emf and, thus, the voltage drop across $R_5$, reach their respective values corresponding to the desired speed except with the motor driving an increased load.

Capacitor $C_4$ and resistor $R_{11}$ coupled in series from the collector of transistor $Q_4$ to ground constitutes a starting circuit for the motor. Transistors $Q_3$ and $Q_4$ behave as a bistable circuit which can be switched from operating condition into a nonconductive condition. At the starting of the tape, or when power is first supplied, the circuit is activated by a current pulse to the base of transistor $Q_3$ through capacitor $C_4$.

As previously explained, transistors $Q_1$ and $Q_2$ of control circuit 13 are kept in cutoff by the pulses from processor circuit 12. These pulses are generated at such a frequency so as to prevent capacitor $C_2$ from charging which, in turn, shunts base drive away from transistor $Q_1$ during normal operation when the speed of the motor is within the preselected range. However, when the speed decreases, capacitor $C_2$ is allowed to charge above the threshold of transistor $Q_1$ which turns on in response thereto. Transistor $Q_2$ is turned on by the base drive supplied by transistor $Q_1$. The emitter of transistor $Q_1$ is coupled to the emitter of transistor $Q_4$, and when transistor $Q_1$ turns on, the emitter junction of transistor $Q_4$ becomes back biased and transistor $Q_4$ turns off. When transistor $Q_4$ turns off, the base drive to transistor $Q_3$ is removed which turns off in response thereto to deactivate motor 16. Since the voltage across motor 16 back biases diodes $D_1$ and $D_2$, the entire current coming from source 103 through resistor $R_2$ is directed into the base of $Q_1$.

Transistor $Q_1$ is maintained in a saturated state until the voltage across the motor decreases to zero. As soon as the motor stops, and the voltage thereacross has been reduced to zero, the base of $Q_2$ is biased by the threshold voltage existing at the terminals of diodes $D_1$ and $D_2$ and the multivibrator begins to oscillate.

The multivibrator oscillates in a standard fashion with capacitor $C_3$ supplying a positive feedback path to the base of $Q_1$. Specifically, when transistor $Q_2$ first turns on, current from transistor $Q_2$ is supplied to the base of transistor $Q_1$ through capacitor $C_3$. Transistor $Q_1$ is maintained in a saturated state by this current until capacitor $C_3$ is sufficiently charged. Toward the end of the charging process, the current will decrease to a magnitude which is insufficient for the saturation of $Q_2$ and the circuit will be unable to remain in the saturated state. As previously explained, once the motor has stopped and the voltage thereacross is decreased to zero, base drive for transistor $Q_1$ cannot be provided through the resistor $R_1$ and $R_2$ and, thus, all base drive must be supplied through capacitor $C_3$. When transistor $Q_2$ turns off, the voltage at its collector decreases which provides a discharge path for capacitor $C_3$. This discharging current is opposite to the charging current and switches transistor $Q_1$ into cutoff. Upon completion of the discharge, transistor $Q_1$ again turns on due to the base bias provided by diodes $D_1$ and $D_2$. The oscillation period is approximately equal to the sum of the charge and discharge time of $C_3$.

The alarm lamp indicator 17 is provided to give visual indication of the various aforementioned conditions. Under normal conditions, when the multivibrator is not oscillating, a lamp 18 of indicator 17 is supplied with a low current insufficient to light the lamp from source 103 through a resistor $R_{12}$. The junction between resistor $R_{12}$ and lamp 18 is coupled to the collector or the transistor $Q_2$, and when transistor $Q_2$ periodically turns on during the oscillations of the multivibrator, current pulses of sufficient magnitude are supplied through transistor $Q_2$ to lamp 18 which flashes on and off in response thereto.

Also coupled to the motor control circuit is tape ejector circuit 14. This ejector circuit is shown simply as a relay coil coupled from the collector of transistor $Q_2$ to ground, which activates a mechanical tape ejector unit (not shown) when transistor $Q_2$ turns on. This same function could also be performed by a relay driver transistor (not shown) having its base driven by the emitter current of transistor $Q_1$.

While I have described one particular embodiment of the invention, it is obvious that it is capable of many modifications within the inventive scope thereof. The embodiments of the invention in which exclusive property or privilege is claimed are defined as follows:

I claim:

1. In a magnetic tape apparatus having a tape take-up reel driven by a motor when connected with a source of power, a control circuit for controlling the motor and for providing an indication of that control, comprising: a first detector responsive to the speed of said take-up reel for developing a first signal corresponding thereto; a second detector responsive to said motor decreasing to zero speed for developing a second signal indicative thereof; indicator means having three different operational modes including a first, nonoscillating operational mode, a second, nonoscillating operational mode, and a third, oscillating operational mode; and control means responsive to said first and second signals for controlling said indicator means and responsive to said first signal for controlling the application of power to said motor, said control means including means for disconnecting said motor from said source of power when said take-up reel speed decreases below a normal speed, and means for causing said indicator means to be in said first operational mode when the take-up reel is at or above said normal speed, to be in said second operational mode when the take-up reel speed is below said normal speed and said motor speed is above zero speed and to be in said third oscillating operational mode when the motor speed is zero.

2. The control circuit of claim 1 wherein said control means includes an oscillator maintained in a nonoscillatory state when the motor speed is above zero and connected with the indicator means to permit selective operation thereof in either of said first and second operational modes when the motor speed is above zero and to cause said indicator to oscillate in said third operational mode when the motor speed is zero.

* * * * *